T. ROSS.
SANITARY FEEDER AND FOUNTAIN.
APPLICATION FILED MAR. 26, 1920.
1,372,371.
Patented Mar. 22, 1921.
2 SHEETS—SHEET 1.
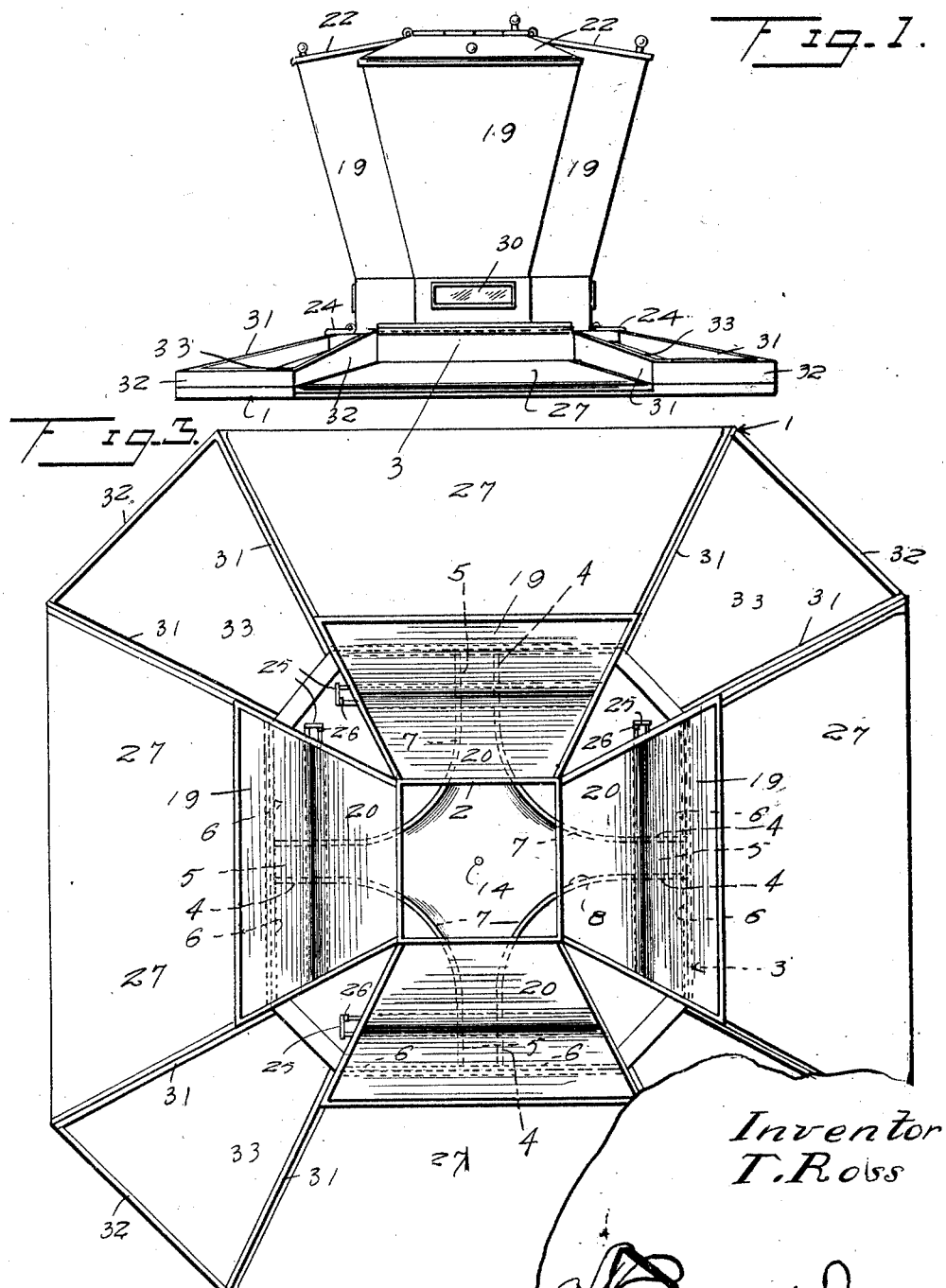

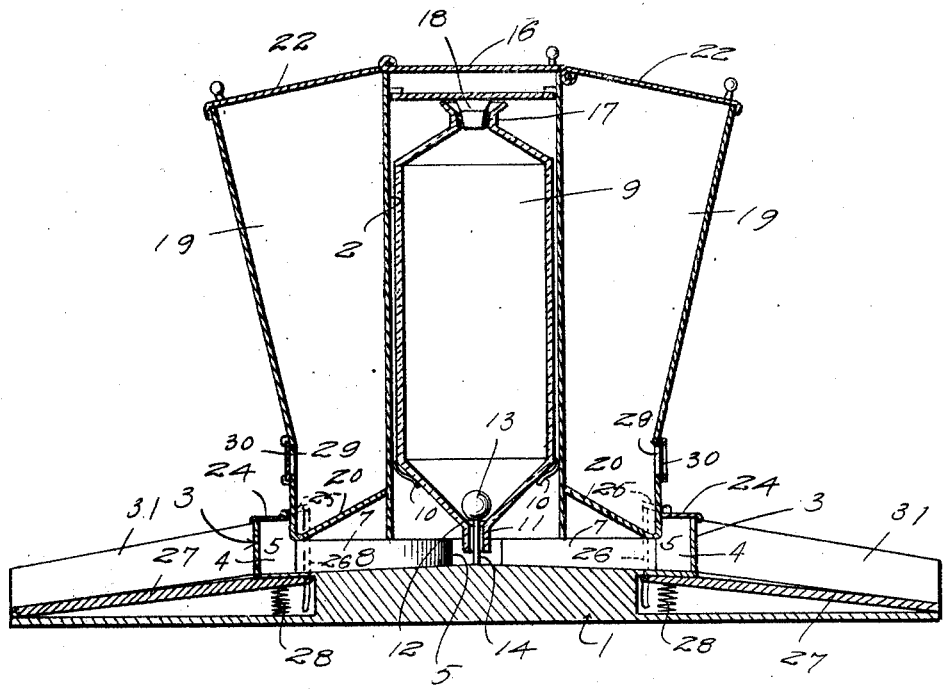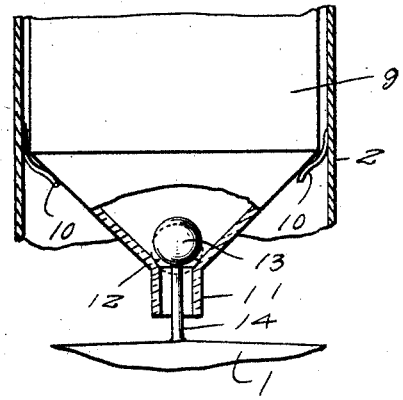

UNITED STATES PATENT OFFICE.

TIM ROSS, OF BURLINGAME, CALIFORNIA.

SANITARY FEEDER AND FOUNTAIN.

1,372,371.  Specification of Letters Patent.  Patented Mar. 22, 1921.

Application filed March 26, 1920. Serial No. 368,948.

*To all whom it may concern:*

Be it known that I, TIM ROSS, a citizen of the United States, residing at Burlingame, in the county of San Mateo, and State of California, have invented certain new and useful Improvements in Sanitary Feeders and Fountains; and I do hereby declare the following to be a full, clear, and exact description of the invention, such as will enable others skilled in the art to which it appertains to make and use the same.

This invention relates to new and useful improvements in combined feeders and fountains, especially adapted for feeding and watering poultry and has for one of its objects the provision of a plurality of separable troughs for containing foods, grit or sand, and water and which troughs are closed by covers to prevent dirt and other foreign matter from entering them and becoming mixed with the food and water, and said covers are adapted to be opened by the weight of fowls and remain in such position until the fowls leave the device.

Another object of this invention is the provision of means for automatically supplying food to the food trough as it is eaten therefrom.

A further object of this invention is the provision of a water receptacle having a valve adapted to be seated and held in a spring rack or support and when so supported the valve is automatically opened for keeping the water in the troughs at a predetermined level.

A still further object of this invention is the provision of a sanitary feeder and fountain of the above stated character, which shall be simple, durable and efficient, and which may be manufactured and sold at a comparatively low cost.

With these and other objects in view as will become more apparent as the description proceeds, the invention consists in certain novel features of construction, combination, and arrangement of parts as will be hereinafter more fully described and claimed.

For a complete understanding of my invention reference is to be had to the following description and accompanying drawings, in which:

Figure 1 is a front elevation illustrating a sanitary feeder and fountain constructed in accordance with my invention, Fig. 2 is a vertical sectional view illustrating the device, Fig. 3 is a top plan view with the covers and water receptacle removed.

Fig. 4 is a vertical sectional view, illustrating the manner of mounting the water receptacle and automatically opening the valve thereof, Fig. 5 is a detail view, illustrating the connection between the covers of the troughs and the platforms.

Referring in detail to the drawings, the numeral 1 indicates a base which has formed centrally thereof a vertically disposed compartment 2 which is of substantially rectangular shape in cross section and said base and compartment at their point of junction have secured thereto troughs 3. The troughs 3 have located therein partitions 4 that form water and feed troughs 5 and 6 respectively. A plurality of curved walls 7 are secured to the base within the compartment 2 and coöperate with each other in forming a water receptacle 8 of cruciform shape. The curved walls 7 join the partitions 4 so that the water troughs 5 are in communication with the water chamber 8. A water receptacle 9 is located within the compartment 2 and is supported therein by resilient or spring elements 10. The lower end of the water receptacle 9 is reduced to form a neck 11 having a valve seat 12 therein which is engaged by a ball valve 13. When the water receptacle 9 is positioned within the chamber 2, the neck 11 thereof receives a pin 14 formed on the base 1 and said pin unseats the ball valve 13 and permits the water within said receptacle to flow into the chamber 8 and thence into the water troughs 5. A plate 15 is detachably secured in the upper end of the chamber 2 and when secured in position forces and holds the water receptacle 9 downwardly against the tension or action of the spring elements 10 causing the pin 14 to unseat the ball valve 13. A cover 16 is provided for closing the upper end of the chamber after the water receptacle has been positioned and locked therein. The upper end of the water receptacle 9 is provided with a filling neck 17 closed by a removable plug 18, thus providing a construction wherein said receptacle 9 can be conveniently filled with water when removed from the chamber 2.

A plurality of compartments 19 are supported by the wall of the chamber 2 and are adapted to contain feed for poultry and said receptacles have their bottom walls inclined as illustrated at 20 and in the direction of outlet openings 21 disposed in the feed troughs 6 so that the feed within said receptacles 19 flows into said troughs 6 by gravity and keeps said troughs constantly filled with feed. The receptacles 19 are closed by hinged covers 22, providing a construction wherein feed or food can be easily placed within said receptacles 19.

The troughs 3 have covers 24 that normally close said troughs and the covers are provided with arms 25 that have connected thereto links 26. The links 26 are in turn connected to platforms 27. The platforms 27 are pivoted at their outer ends to the base 1 and have their inner ends normally urged upwardly by springs 28 so that said platforms leading to the troughs 3 are normally in elevated position and permit the covers 24 to close the troughs 3 and when poultry walk upon the troughs and reach a point adjacent the inner ends of the troughs, their weight moves the inner ends of the platforms downwardly and swings the covers to open position exposing the water and feed in said troughs, and as soon as the poultry leaves the platforms the covers 24 are automatically returned to closed position by the upward movement of the inner ends of said platforms. Thus it will be seen that the food and water when not in use are protected from dirt and foreign matter.

The receptacles 19 are provided with sight openings 29 closed by transparent panels 30 which permits a person to readily determine if said receptacles contain food or not.

Converging walls 31 are secured to the base between the platforms 27 and are connected to outer end walls 32 for defining auxiliary troughs or chambers 33 for containing sand or grit. The bottom walls of the receptacles 33 are inclined as clearly shown in the drawings so that the sand or grit normally gravitates toward the end walls 32 thereby permitting fowls to readily obtain such ingredients.

While I have shown and described the preferred embodiment of my invention, it will be understood that minor changes in construction, combination, and arrangement of parts may be made without departing from the spirit and scope of the invention as claimed.

Having thus described my invention, what I claim is:

1. A device of the character set forth comprising a base, a vertical chamber on said base, troughs carried by said base, water run-ways formed on said base and leading to the troughs and of substantially cruciform shape, spring elements in said chamber, a water receptacle supported by the spring elements and having a ball valve, a pin carried by the base and adapted to unseat the ball valve, when said receptacle is seated in the chamber, a locking element carried by said chamber for forcing the receptacle downwardly against the spring elements, and a cover for said chamber.

2. A device of the character set forth comprising a base, a vertical chamber carried centrally of the base, a plurality of troughs carried by the base and divided into water and feed compartments, a plurality of curved walls carried by the base and each leading to a pair of troughs and coöperating with each other in forming a water passage of cruciform shape, said water passage having its ends in communication with the water compartments of the trough, means supported in the vertical chamber for supplying water to the water passage, and a plurality of feed compartments carried by the vertical chamber upon its outer faces and having communication with the feed compartments of the trough, the lower ends of the feed compartments carried by the vertical chamber being supported by the curved walls.

In testimony whereof I affix my signature in presence of two witnesses.

TIM ROSS.

Witnesses:
E. H. GREEN,
H. C. MAUR.